United States Patent [19]

Avisse

[11] Patent Number: 4,694,246

[45] Date of Patent: Sep. 15, 1987

[54] MOVABLE CORE TRANSDUCER

[75] Inventor: Jean-Bernard Avisse, Castelneau de Medoc, France

[73] Assignee: Societe Anonyme: Societe Europeenne de Propulsion, Puteaux, France

[21] Appl. No.: 909,306

[22] Filed: Sep. 19, 1986

[30] Foreign Application Priority Data

Sep. 20, 1985 [FR] France .................... 85 13970

[51] Int. Cl.$^4$ .................... G01B 7/14; H01F 21/06
[52] U.S. Cl. .................... 324/207; 336/136; 340/870.36
[58] Field of Search .................... 336/130, 30, 136; 323/347; 340/870.35, 870.36; 73/728; 324/207, 208

[56] References Cited

U.S. PATENT DOCUMENTS

| | | | |
|---|---|---|---|
| 3,017,589 | 1/1962 | Chass | 336/136 |
| 3,054,976 | 9/1962 | Lipshutz | 336/136 |
| 3,138,772 | 6/1964 | Persons, Jr. | 336/136 |
| 3,235,790 | 2/1966 | Collins | 336/136 X |
| 4,052,900 | 10/1977 | Ganderton | 336/30 X |
| 4,339,739 | 7/1982 | Dron | 336/136 |

FOREIGN PATENT DOCUMENTS 1058845 2/1952 France .
2297403 1/1976 France .
0028971 11/1980 France .

Primary Examiner—Thomas J. Kozma
Attorney, Agent, or Firm—Lowe Price Leblanc Becker & Shur

[57] ABSTRACT

The transducer has a primary winding wound around a first cylindrical support which delimits a passage where a core is axially movable, a first secondary winding wound around the primary winding and a second secondary winding wound on a second cylindrical support which surrounds completely the first secondary winding. The first secondary winding is formed in two portions: a regularly wound portion and a stepped portion which are phase connected, and the second secondary winding is formed in two similar portions which are antiphase connected. The output signals of the secondary windings are combined to obtain a differential signal representative of the ratio between the sum and the difference of said signals. The secondary windings are designated so that the ratio cannot reach the value +1 or −1 unless one secondary winding is cut-off, thus conferring to the transducer the capacity of being self-monitored. The separation between the secondary windings avoids any substantial capacitive coupling therebetween, and their mounting on separate supports makes it possible to vary their mutual axial position to adjust the response characteristics of the transducer.

5 Claims, 3 Drawing Figures

MOVABLE CORE TRANSDUCER

BACKGROUND OF THE INVENTION

The invention relates to a movable core transducer, and more particularly to a transducer of the differential transformer type.

Transducers of the above type are used in various applications where the position and/or displacement of an object in translation is to be converted into an electric signal.

Transducers of the differential transformer type are disclosed for example in the U.S. Pat. Nos. 3,054,976 (Lipshutz) and 3,235,790 (Collins). Such transducers include a primary winding and two secondary windings wound around a passage in wich a core is movable, said core being connected to a member of which the position or displacement is to be measured. The secondary windings are connected to provide a differential output signal varying as a function of the position of the movable core. These known transducers show several drawbacks. Firstly, the relation between the output signal and the position or displacement to be measured is dependent on variation in temperature and in amplitude of the voltage applied to the primary winding. In addition, there is no means to check the integrity of the transducer from the value of the output signal; for example, a zero output signal can mean that the core is in a particular position but can also result from a defect in the windings.

In order to eliminate the above drawbacks, it has been suggested in the U.S. Pat. No. 4,339,739, to provide a transducer of the differential transformer type which can be "self-monitored" by forming each secondary winding in two parts: one secondary winding including a basic part and an additional part connected in phase and the other secondary winding including similar basic part and additional part but connected in antiphase (opposition of phase). The output signals v1, v2 at the separate output terminals of the two secondary windings are combined to deliver a differential output signal representative of the ratio $r=(v1+v2)/(v1-v2)$. By designing the secondary windings such that the above ratio cannot reach the values $+1$ or $-1$, a self-monitored transducer can be obtained, because a value of r equal to $+1$ or $-1$ means that a cut-off has occurred in a secondary winding. However, the secondary windings are formed "two wires in hand", i.e. the corresponding basic parts and additional parts of the secondary windings are formed simultaneously by winding their two respective constituent wires simultaneously and side by side. As a result, the secondary windings are capacitively coupled and, in practice, the above ratio r has a value different from $+1$ or $-1$ even when one secondary winding is cut-off. The transducer cannot then be reliably self-monitored, all the more reason that the frequency of the current fed to the primary winding is high.

OBJECT AND SUMMARY OF THE INVENTION

It is therefore an object of the invention to provide a movable core transducer of the differential transformer type which generates a differential output signal independent of variations in temperature or in amplitude of the voltage applied to the primary winding, and which can be effectively self-monitored even at high frequencies.

This object is reached according to the invention with a transducer comprising:

an axisymmetrical passage for a movable core connectable with a member of which the displacement or position is to be measured;

a primary winding wound around said passage and having input terminals to be energized with an input current;

a first secondary winding wound around said primary winding and including a first portion and a second portion arranged in a first phase relationship, said first secondary winding having first output terminals to deliver a first output signal when the primary winding is energized;

a rigid cylindrical support member surrounding said first secondary winding;

a second secondary winding wound around said cylindrical support member and including a first portion and a second portion respectively similar to the first portion and the second portion of the first secondary winding, but arranged in a second phase relationship opposite to said first phase relationship, said second secondary winding having second output terminals separate from said first output terminals to deliver a second output signal when the primary winding is energized; and circuit means connected to said first and second output terminals for delivering a differential output signal representative of the ratio between the sum and the difference of said first and second output signals;

said rigid cylindrical support member completely separating said first and second secondary windings one from the other and allowing the axial position of the second secondary winding with respect to that of the first secondary winding to be varied at the end of the manufacturing process of the transducer to adjust response characteristics thereof.

The invention will be more readily understood from the reading of the following description made with respect to the accompanying drawings.

DETAILED DESCRIPTION

Before describing in detail a preferred embodiment of the invention, a prior art movable core transducer of the differential transformer type will be first described with reference to FIGS. 1, 2.

Figure 1:
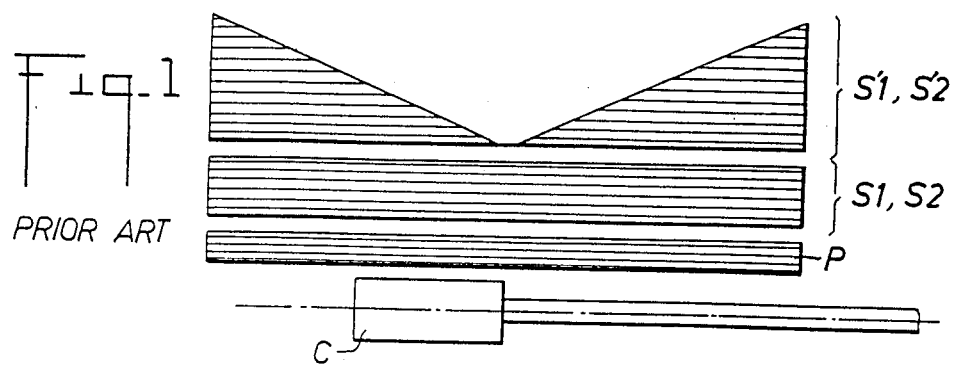
FIG. 1 diagrammatically shows a longitudinal half-section of movable core transducer according to the prior art.

In the prior art transducer illustrated by FIG. 1, the differential transformer includes a primary winding P, wound around a passage where a core C is axially movable, and two secondary windings S1-S'1, S2-S'2 wound around the primary winding P. Each one of the secondary windings has a regular portion S1,S2 and a stepped portion S'1, S'2.

The regular winding portions S1, S2 show a constant number of turns in the axial direction all along the transducer. In order to obtain winding portions S1, S2 with identical or nearly identical characteristics, they are formed "two wires in hand". By "two wires in hand" winding is meant here the technique which consists in winding the two coils by simultaneously bringing their two constituent wires side by side.

Each stepped winding portion S'1, S'2 has two parts one symmetrical to the other with respect to the median transversal plane of the transducer. In each of said parts, the number of turns increases regularly from the middle of the transducer to the end thereof, and in each stepped wiring portion the two parts thereof are antiphase connected. The winding portions S'1 and S'2 are also formed by the "two wires in hand" technique in order to have identical or nearly identical characteristics.

The winding portions S1 and S'1 forming the first secondary winding are connected in phase, whereas the windings S2 and S'2 forming the second secondary winding are connected in antiphase (phase opposition). Thus, when the primary winding P is a.c. supplied, voltages 1 and 2 delivered at the output terminals of the two secondary windings vary according to linear functions of the position coordinate x of the core, the representative curves of which are parallel and offset one with respect to the other as illustrated in FIG. 2. Voltages v1 and v2 are combined to obtain a differential signal $r=(v1+v2)/(v1-v2)$ depending only on the coordinate x and highly insensitive to variations in temperature and in the a.c. voltage supplied to the primary winding. The gradient of the stepped windings S'1, S'2 is chosen so that r cannot take the value $+1$ or $-1$ throughout the transducer serviceable range. In principle, said value $+1$ or $-1$ can then only be reached if one of the secondary windings is cutt off (v1 or v2=0); the transducer is then self-monitored, detection r=1 or r=−1 indicating a breakdown.

Figure 3:
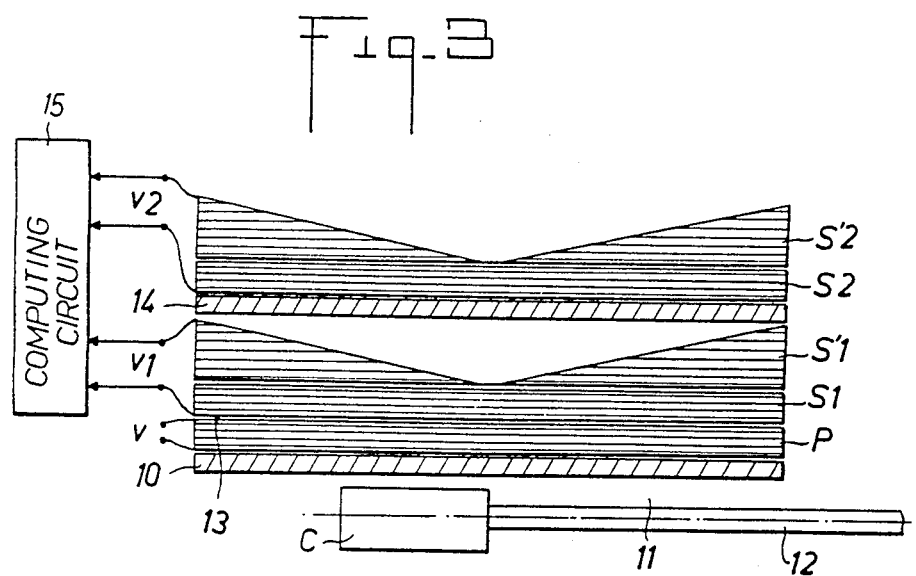
FIG. 3 diagrammatically shows a longitudinal half-section of a movable core transducer according to the invention.

However, as already mentioned, the secondary windings wound by the "two wires in hand" technique are capacitively connected and, even in the case of breakdown of a secondary winding, r has an absolute value difference of 1 due to the capacitive coupling between the secondary windings. The transducers cannot then be any longer self-monitored, all the more reason that the frequency of the current fed to the primary increases. To avoid this drawback, in a movable core transducer according to the present invention, the secondary windings are formed separately one from the other as shown in FIG. 3. In FIGS. 1 and 3, the same reference designate the same or similar parts.

The transducer shown in FIG. 3 includes a core C axially movable in a passage 11 formed by a rigid cylindrical support 10 made of an insulating material. The core C is in magnetic material and is connected via a rod 12 to a member (not shown) of position or displacement to be measured.

The first secondary winding S1-S'1 is wound on and around the primary winding P with interposition of an insulating layer 13 such as a sheet of paper or other insulating material wound around the primary winding P. The winding portion S1 is first wound in regular layers all along the transducer and is phase connected to the winding stepped portion S'1 having two parts symmetrical one to the other with respect to the middle transversal plane of the transducer. In said parts forming the winding stepped portion S'1, the number of turns increases from the middle of the transducer to its ends. The two parts forming the winding portion S'1 are wound in the same direction but are antiphase-connected.

A cylindrical rigid support member 14 of circular cross-section and in insulating material completely surrounds the first secondary winding S1-S'1.

The second secondary winding S2-S'2 is wound on the support member 14 and includes a regular winding portion S2 and a stepped winding portion S'2 respectively similar to the winding portions S1,S'1 of the first secondary winding. The regular winding portion S2 is wound on the support 14 in regular layers all along the transducer and is antiphase connected to the stepped portion S'2. The latter has the same meridian section as winding portion S'1 and is also made in two parts which are antiphase connected one to the other.

It may be noted that the antiphase arrangement of two windings may be obtained either by having windings with opposite winding directions which are serially connected, or by having windings with the same winding direction which are connected in opposition.

Figure 2:
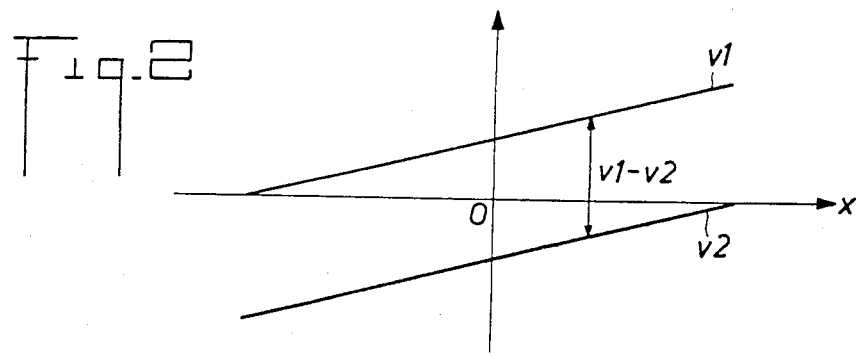
FIG. 2 illustrates the variation of the output signals from the secondary windings of the transducer of FIG. 1 as a function of the position of the movable core transducer.

When primary winding P is supplied with an alternative current v, the output voltages at the separate output terminals of the secondary windings are v1 and v2 such as shown in FIG. 2. The differential output signal of the transducer is generated by a computer circuit 15 connected to the output terminals of the secondary windings to receive voltages v1 and v2 and to work out the differential quantity $r=(v1-v2)/(v1+v2)$.

By suitably choosing the gradient of the stepped winding portions S'1, S'2, it is possible to ensure that the absolute value of r is always appreciably less than 1 through the whole serviceable stroke of the core C. Thus, when one of the secondary windings is cut-off, the breakdown may be signalled by detecting that the ratio r has an absolute value equal to 1 or very near to 1. Due to the separate realization and mounting of the secondary windings, the capacitive coupling therebetween is very low and does not affect the capacity of the transducer to be self-monitored, even when the frequency of the current supplied to the primary winding is relatively high (several kHz).

The two stages of the transducer, i.e. that comprising windings P, S1, S'1 and that comprising windings S2, S'2 may be produced separately and then assembled by inserting the support 10 with windings P, S1, S'1 inside cylindrical support 14. The fact of using programmable winders makes it possible to obtain accurately identical or near-identical characteristics for the two secondary windings. Preferably, when producing the secondary windings care should be taken that the windings be produced with jointed turns so as to ensure that no defect is introduced in one secondary which could not be reproduced in the other.

According to one advantageous feature of the transducer according to the invention, it is possible to adjust the transducer response (sensitiveness) by mutual displacement of the secondary windings along the axis. This may be done, quite simply, at the end of the manufacturing process, when assembling the two stages of the transducers, by adjusting the axial positions of the cylindrical supports 10 and 14 one with respect to the other, this completely eliminating the problems of size and reliability raised by the use, for adjusting the response of the transducer, of components added to the windings.

The stepped windings illustrated in the drawings have a number of turns which varies linearly from the initial position in the center of the core to each end of its stroke. Therefore, quantity r is a linear function of the core position with respect to its initial position. Obviously, with a suitable configuration of the non-regular winding portions of the secondaries, a transducer will be obtained of which the output signal varies according to any required function of the position of the core.

I claim:

1. A movable core transducer of the differential transformer type, comprising:

an axisymmetrical passage for a movable core connectable with a member of which the displacement or position is to be measured;

a primary winding wound around said passage and having input terminals to be energized with an input current;

a first secondary winding wound around said primary winding and including a first portion and a second portion arranged in a first phase relationship, said first secondary winding having first output terminals to deliver a first output signal when the primary winding is energized;

a rigid cylindrical support member surrounding said first secondary winding;

a second secondary winding wound around said cylindrical support member and including a first portion and a second portion respectively similar to the first portion and the second portion of the first secondary winding, but arranged in a second phase relationship opposite to said first phase relationship, said second secondary winding having second output terminals separate from said first output terminals to deliver a second output signal when the primary winding is energized; and circuit means connected to said first and second output terminals for delivering a differential output signal representative of the ratio between the sum and the difference of said first and second output signals;

said rigid cylindrical support member completely separating said first and second secondary windings one from the other and allowing the axial position of the second secondary winding with respect to that of the first secondary winding to be varied at the end of the manufacturing process of the transducer to adjust response characteristics thereof.

2. A transducer as claimed in claim 1, wherein said second winding portions have a number of turns which varies along the axis of the transducer.

3. A transducer as claimed in claim 1, wherein said primary winding is wound around a rigid cylindrical support element delimiting said passage.

4. A transducer as claimed in claim 3, wherein said first secondary winding is wound around the primary winding with the interposition of an insulating layer.

5. A transducer as claimed in claim 4, wherein said rigid support member bearing the primary winding and the first secondary winding and said rigid support element bearing the second secondary winding constitute two sub-assemblies having adjustable relative axial position.

* * * * *